(12) United States Patent
Leijten (10) Patent No.: US 9,201,657 B2
(45) Date of Patent: Dec. 1, 2015

(54) LOWER POWER ASSEMBLER

(75) Inventor: Jeroen Anton Johan Leijten, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 2846 days.

(21) Appl. No.: 11/568,714

(22) PCT Filed: May 9, 2005

(86) PCT No.: PCT/IB2005/051491
§ 371 (c)(1),
(2), (4) Date: Feb. 23, 2010

(87) PCT Pub. No.: WO2005/111792
PCT Pub. Date: Nov. 24, 2005

(65) Prior Publication Data
US 2010/0153691 A1    Jun. 17, 2010

(30) Foreign Application Priority Data

May 13, 2004   (EP) .................................... 04102104

(51) Int. Cl.
*G06F 9/38* (2006.01)
*G06F 9/30* (2006.01)
*G06F 9/45* (2006.01)

(52) U.S. Cl.
CPC ............... *G06F 9/3842* (2013.01); *G06F 8/52* (2013.01); *G06F 9/30076* (2013.01); *G06F 9/30156* (2013.01); *G06F 9/3822* (2013.01); *G06F 9/3853* (2013.01); *G06F 9/3885* (2013.01)

(58) Field of Classification Search
CPC .. G06F 9/30076; G06F 9/3853; G06F 9/3842
See application file for complete search history.

(56) References Cited

U.S. PATENT DOCUMENTS 6,535,984 B1    3/2003  Hurd
6,725,450 B1 *  4/2004  Takayama ..................... 717/139
7,299,369 B2 * 11/2007  Webster et al. ............... 713/320

OTHER PUBLICATIONS

Marco Bekooij, Constraint Driven Operation Assignment for Retargetable VLIW Compilers, Dissertation, Eindhoven University of Technology, Eindhoven, Netherlands, Jan. 12, 2004.*
Peter M. Kogge; "The Architecture of Pipelined Computers"; 1981; McGraw-Hill; New York; XP002383441; pp. 115-119.

* cited by examiner

*Primary Examiner* — Benjamin Geib
(74) *Attorney, Agent, or Firm* — Leydig, Voit & Mayer, Ltd.

(57) ABSTRACT

A method for processing data using a time-stationary multiple-instruction word processing apparatus, arranged to execute a plurality of instructions in parallel, said method comprising the following steps: generating a set of multiple-instruction words (INS(i), INS(i+1), INS(i+2)), wherein each multiple-instruction word comprises a plurality of instruction fields, wherein each instruction field encodes control information for a corresponding resource of the processing apparatus, and wherein bit changes between an instruction field related to a no-operation instruction, and a corresponding instruction field of an adjacent multiple-instruction word are minimised; storing input data in a register file ($RF_0$, $RF_1$); processing data retrieved from the register file based on control information derived from the set of multiple-instruction words; disabling the write back of result data to the register file during execution of a no-operation instruction using a first dedicated no-operation code ($ws_{00}$, $ws_{10}$, $wp_{00}$, $wp_{10}$).

10 Claims, 4 Drawing Sheets

LOWER POWER ASSEMBLER

TECHNICAL FIELD

The invention relates to a method for processing data using a time-stationary multiple-instruction word processing apparatus, as well as a time-stationary multiple-instruction word processing apparatus to perform said method for processing data. The invention further relates to a method for generating a set of multiple-instruction words in binary program code, as well as a compiler program product using said method for generating a set of multiple-instruction words.

BACKGROUND ART

Programmable processors can be general purpose processors or application-specific instruction-set processors. They can be used for manipulating different types of information, including sound, images and video. In case of application specific instruction-set processors, the processor architecture and instruction set is customized, which reduces the system's cost and power dissipation significantly. Processor architectures usually consist of a fixed data path, which is controlled by a set of control words. Each control word controls parts of the data path and these parts may comprise register addresses and operation codes for arithmetic logic units (ALUs) or other functional units. Each set of instructions generates a new set of control words, usually by means of an instruction decoder which translates the binary format of the instruction into the corresponding control word, or by means of a micro store, i.e. a memory which contains the control words directly. Typically, a control word represents a RISC like operation, comprising an operation code, two operand register indices and a result register index. The operand register indices and the result register index refer to registers in a register file.

In case of a Very Large Instruction Word (VLIW) processor, multiple instructions are packaged into one long instruction, a so-called VLIW instruction. A VLIW processor uses multiple, independent functional units to execute these multiple instructions in parallel. The processor allows exploiting instruction-level parallelism in programs and thus executing more than one instruction at a time. Due to this form of concurrent processing, the performance of the processor is increased. In order for a software program to run on a VLIW processor, it must be translated into a set of VLIW instructions. The compiler attempts to minimize the time needed to execute the program by optimizing parallelism. The compiler combines instructions into a VLIW instruction under the constraint that the instructions assigned to a single VLIW instruction can be executed in parallel and under data dependency constraints. In case no meaningful processing can take place in certain clock cycles for one or more functional units, a so-called no-operation (NOP) instruction is encoded in the VLIW instruction for that particular functional unit. In order to reduce the code size, and thus saving costs in terms of required memory size and in terms of required memory bandwidth, a compact representation of no-operation (NOP) instructions in a data stationary VLIW processor may be used, e.g. the NOP operations are encoded by single bits in a special header attached to the front of the VLIW instruction, resulting in a compressed VLIW instruction.

To control the operations in the data pipeline of a processor, two different mechanisms are commonly used in computer architecture: data-stationary and time-stationary encoding, as disclosed in "Embedded software in real-time signal processing systems: design technologies", G. Goossens, J. van Praet, D. Lanneer, W. Geurts, A. Kifli, C. Liem and P. Paulin, Proceedings of the IEEE, vol. 85, no. 3, March 1997. In the case of data-stationary encoding, every instruction that is part of the processor's instruction-set controls a complete sequence of operations that have to be executed on a specific data item, as it traverses the data pipeline. Once the instruction has been fetched from program memory and decoded, the processor controller hardware will make sure that the composing operations are executed in the correct machine cycle. In the case of time-stationary coding, every instruction that is part of the processor's instruction-set controls a complete set of operations that have to be executed in a single machine cycle. These operations may be applied to several different data items traversing the data pipeline. In this case it is the responsibility of the programmer or compiler to set up and maintain the data pipeline. The resulting pipeline schedule is fully visible in the machine code program. Time-stationary encoding is often used in application-specific processors, since it saves the overhead of hardware necessary for delaying the control information present in the instructions, at the expense of larger code size.

Programmable processors, such as a VLIW processor, may still unnecessarily consume power during executing of NOP instructions. This problem related to NOP instructions is particularly present in parallel processors whenever these need to execute less parallel code, for example control dominated code. Especially in case of a highly parallel VLIW processor, this results in a large number of NOP instructions in the code, and hence unnecessary power consumption during execution of the NOP instructions. Traditionally, NOP instructions are encoded using a dedicated value recognised by the processing apparatus and not resulting in a change in the state of the processing apparatus. However, since the default code for NOP instructions obviously must be different from that of useful instructions, encoding NOP instructions in this way results in signal transitions and therefore unnecessary power consumption during execution of a NOP instruction, following or preceding a useful instruction. In order to decrease power consumption during the execution of NOP instructions a technique referred to as clock gating may be used, which shuts downs parts of the processor's datapath that are not used. The use of clock gating not only reduces the amount of power dissipated by unused sequential logic, but (pipeline) registers disabled by the clock gates will prevent signal transitions from rippling through unused combinatoric logic as well, and thus prevent further unnecessary power consumption. However, the latter is highly determined by the amount of (pipeline) registers present and the exact location of these registers. Low-power processors ideally have undeep pipelines to prevent the need for additional power-consuming hardware required to resolve adverse pipeline effects, such as long branch latencies. The latter holds in particular for processors where computational efficiency is crucial, since these processors are often highly parallel, ie. have many issue slots, and creating deep pipelines would add considerable hardware overhead in each issue slot. For reasons of minimising the amount of hardware, these highly parallel processors often use time-stationary instruction encoding to enable steering the vast number of hardware resources from a single highly parallel instruction without running into major instruction fetching and decoding bottlenecks.

U.S. Pat. No. 6,535,984 describes a power reduction technique for VLIW processors, based on the use of so-called proxy NOP instructions. The number of signal transitions caused by NOP instruction is reduced, by replacing a NOP instruction with the adjacent non-NOP instruction for the same issue slot of the VLIW processor, and at the same time making the guard of the substituted instruction equal to false, so that the decode circuitry does not send any execute/enable signals to the particular functional unit. These substituted instructions with false guards are named proxy NOP instructions. The described technique relies on the fact that a data stationary instruction encoding is used, where all information related to an instruction is encoded in a single atomic portion of a single VLIW instruction issued in a single processor cycle. Furthermore, this technique assumes that each issue slot in the VLIW processor supports guarding. Moreover, the technique assumes that every operation supported by any issue slot in the VLIW processor can be guarded, i.e. is conditional. However, this technique is unsuitable for time-stationary VLIW processors. First, in time-stationary encoding information related to a single instruction is typically spread across several VLIW instructions issued in different cycles, which means that information on NOP instructions corresponding to a single instruction is spread across multiple VLIW instructions. Second, instructions for time-stationary processors often do not encode operations as atomic entities. Instead, control information is encoded to directly steer processor resources, such as functional units, register files, bus multiplexers etc. This decoupling of "abstract" instruction information from actual resource steering, allows techniques such as multicasting where the result of a single operation can optionally be written to multiple register files in a single processor cycle. For example, in data-stationary encoding, write back information, i.e. control information to write back result data into to the register file, is normally encoded in separate instruction fields per operation result. Each field in this case contains a destination register address (register file, register index) specifying the register in which the corresponding result should be written. In cases where the same result is to be written into multiple register files, multiple destination register addresses to be encoded in multiple fields per operation result would be required. This is usually not supported in a data-stationary instruction format, because no efficient encoding exists, especially if the number of destinations to be receiving the same result can vary. Alternatively, separate instructions need to be added to a program to explicitly copy a result to other register files. Time-stationary encoding allows the use of separate fields to encode write back information per register file write port, rather than per operation result. Hence, rather than specifying per operation result in which register files a result should be written, one can specify per register file write port which operation result should be selected to be written into the register file. With this concept the same result can be written to an arbitrary number of register files in a single cycle, without impacting the number of instruction fields required. As a result of this decoupling, the same field in a time-stationary instruction can carry information corresponding to operations executed on different issue slots in different clock cycles. A given register file write port field in an instruction issued at cycle i+2 (i=0, 1, 2 . . . ) may select a result produced by a first issue slot as the result of an instruction issued two cycles earlier in cycle i, whereas in the next instruction issued at cycle i+3 it may select a result produced by a second issue slot as the result of the instruction issued one cycle earlier at cycle i+2. Hence, one cannot identify a single group of instruction bits per instruction that encodes all control information belonging to a single complete NOP operation.

It is therefore a disadvantage of the prior art method of reducing power usage by a VLIW processor, that this method can not be used for time-stationary processors.

DISCLOSURE OF INVENTION

An object of the invention is to provide a method for processing data using a time-stationary multiple-instruction word processor, that reduces the power consumption during execution of NOP instructions, while maintaining an efficient encoding and decoding of instructions.

This object is achieved with a method for processing data using a time-stationary multiple-instruction word processing apparatus, arranged to execute a plurality of instructions in parallel, said method comprising the following steps: generating a set of multiple-instruction words, wherein each multiple-instruction word comprises a plurality of instruction fields, wherein each instruction field encodes control information for a corresponding resource of the processing apparatus, and wherein bit changes between an instruction field related to a no-operation instruction, and a corresponding instruction field of an adjacent multiple-instruction word are minimised; storing input data in a register file; processing data retrieved from the register file based on control information derived from the set of multiple-instruction words; disabling the write back of result data to the register file during execution of a no-operation instruction using a first dedicated no-operation code. The instruction fields are encoded in such a way that if control information related to a NOP instruction is encoded, the values used for encoding these NOP instruction fields are repeated as much as possible from a corresponding field of an adjacent multiple-instruction word. As a result, the corresponding combinatoric logic in the processing apparatus will carry the same value as in the preceding or succeeding cycle and consequently less rippling of data transitions and therefore unnecessary power consumption occurs. In order to avoid the write back of result data to the register file during execution of a NOP operation, a dedicated NOP code is used to disable the write back of result data. Hence, during execution of the NOP instruction the state of the processor is not changed, while the power consumption is reduced. During encoding of NOP instructions, for some instruction fields values from another encoded instruction are repeated, while for other instruction fields dedicated values are used which renders the encoding efficient. The decoding of NOP instructions is performed in an identical manner as for any other instruction.

An embodiment of the method for processing data according to the invention is characterized in that the method further comprises the step of further preventing a change in the state of the processing apparatus during execution of a no-operation instruction using a second dedicated no-operation code for encoding an opcode. For some issue slots, when encoding the NOP opcode instruction field by repeating the opcode of a corresponding field of an adjacent multiple-instruction word, this may result in change of the state of the processing apparatus during execution of a NOP operation. By using a dedicated NOP code for encoding such opcode, this change in state is prevented.

An embodiment of the method for processing data according to the invention is characterized in that the adjacent multiple instruction word is adjacent to the multiple-instruction word, comprising the instruction field related to the no-operation instruction, in the set of multiple-instruction words as derived after compilation of a computer program. Repeating the value of a corresponding field from an adjacent multiple-instruction word is relatively easy, only requiring to keep track of the instruction preceding and succeeding the current instruction being translated. The power consumption during execution of NOP instructions in straight-line code, i.e. without jumps, is reduced.

An embodiment of the method for processing data according to the invention is characterized in that the adjacent multiple instruction word is most likely to be adjacent to the multiple-instruction word, comprising the instruction field related to the no-operation instruction, during execution of the set of multiple-instruction words, as derived from profiling information. Using profiling information obtained from program execution, the most frequently taken paths in a given program can be analysed, and can be determined which instruction is most likely to proceed or succeed a given instruction during execution. Repeating the value for encoding an instruction field of an multiple-instruction word preceding or succeeding a given multiple-instruction word during encoding, provided the control information related to those field do not result in a state change of the processing apparatus, even further reduces the power consumption during execution of NOP instructions.

According to the invention, a processing apparatus arranged to perform the method for processing data according to claim 1, comprises: a plurality of issue slots arranged for parallel execution of the plurality of instructions; a register file accessible by the plurality of issue slots; a communication network for coupling the plurality of issue slots and the register file; a controller arranged for controlling the processing apparatus based on control information derived from the set of multiple-instruction words. As a result, the corresponding combinatoric logic in the processing apparatus will carry the same value as in the preceding or succeeding cycle and consequently less rippling of data transitions and therefore unnecessary power consumption occurs. Hence, during execution of the NOP instruction the state of the processor is not changed, while the power consumption is reduced.

An embodiment of the processing apparatus is characterized in that the register file is a distributed register file. An advantage of a distributed register file is that it requires less read and write ports per register file segment, resulting in a smaller register file in terms of silicon area. Furthermore, the addressing of a register in a distributed register file requires less bits when compared to a central register file.

An embodiment of the processing apparatus is characterized in that the communication network is a partially connected communication network. A partially connected network is often less time critical and less expensive in terms of code size, area and power consumption, when compared to a fully connected communication network, especially in case of a large number of execution units.

An embodiment of the processing apparatus is characterized in that the processing apparatus is a time-stationary Very Large Instruction Word processor. A time-stationary VLIW processor allows executing multiple instructions in parallel, increasing the overall speed of operation, while having relatively simple hardware. In spite of these processors usually having an undeep pipeline, rippling of signal transitions through combinatoric logic, and hence the power consumption, is reduced during execution of NOP instructions.

According to the invention a method for generating a set of multiple-instruction words in binary program code is claimed in claim 9. The method generates a set of instructions allowing to reduce the power consumption during execution of a set of multiple-instruction words comprising NOP instructions, while simultaneously hardly requiring any hardware changes in the instruction decoder for a given processing apparatus.

According to the invention a compiler program product arranged for generating a sequence of instructions in binary program code using the method for generating a set of instructions is claimed in claim 10.

DESCRIPTION OF PREFERRED EMBODIMENTS

Figure 1:
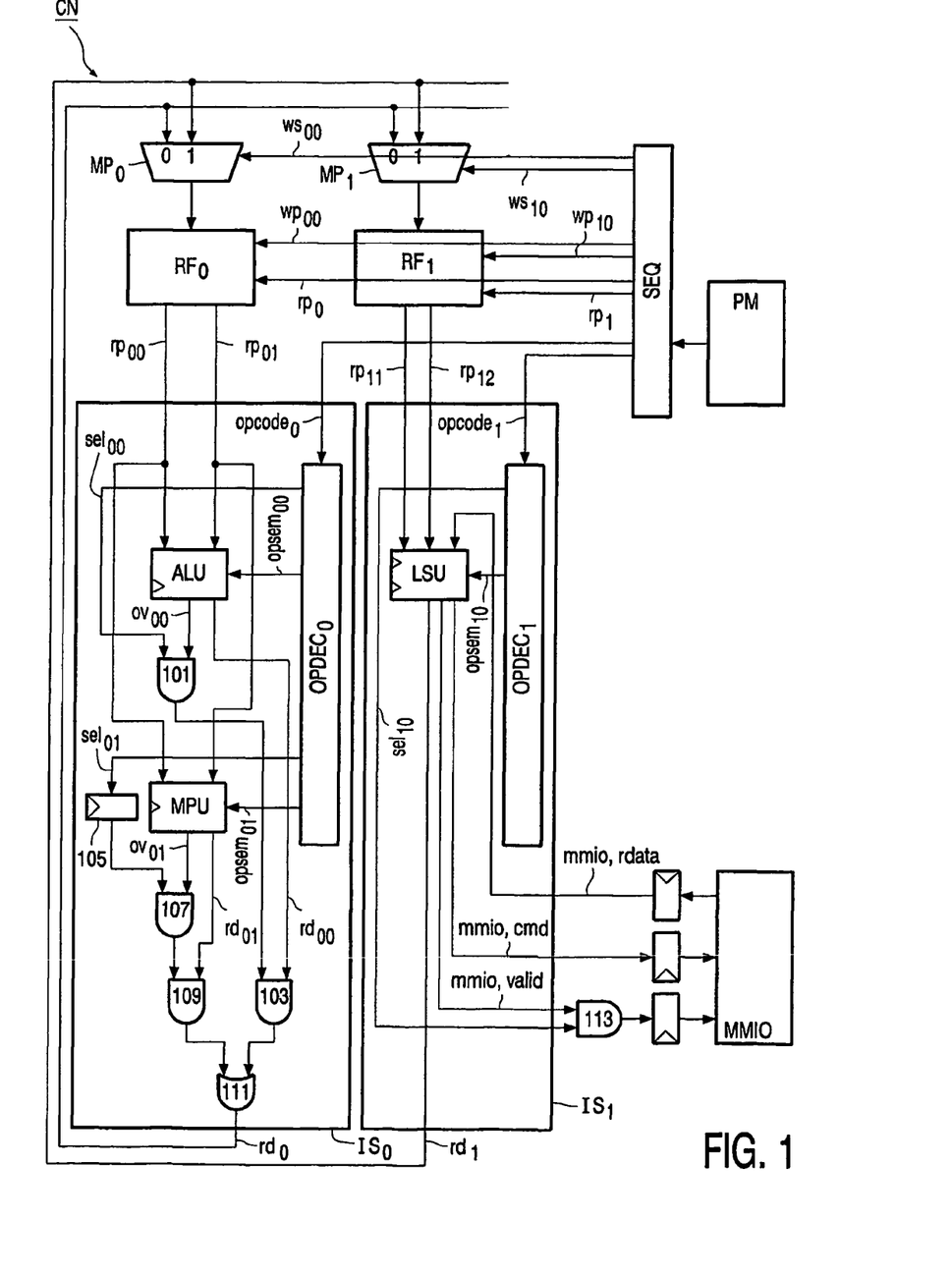
FIG. 1 shows a schematic block diagram of a first VLIW processor according to the invention.
Figure 3:
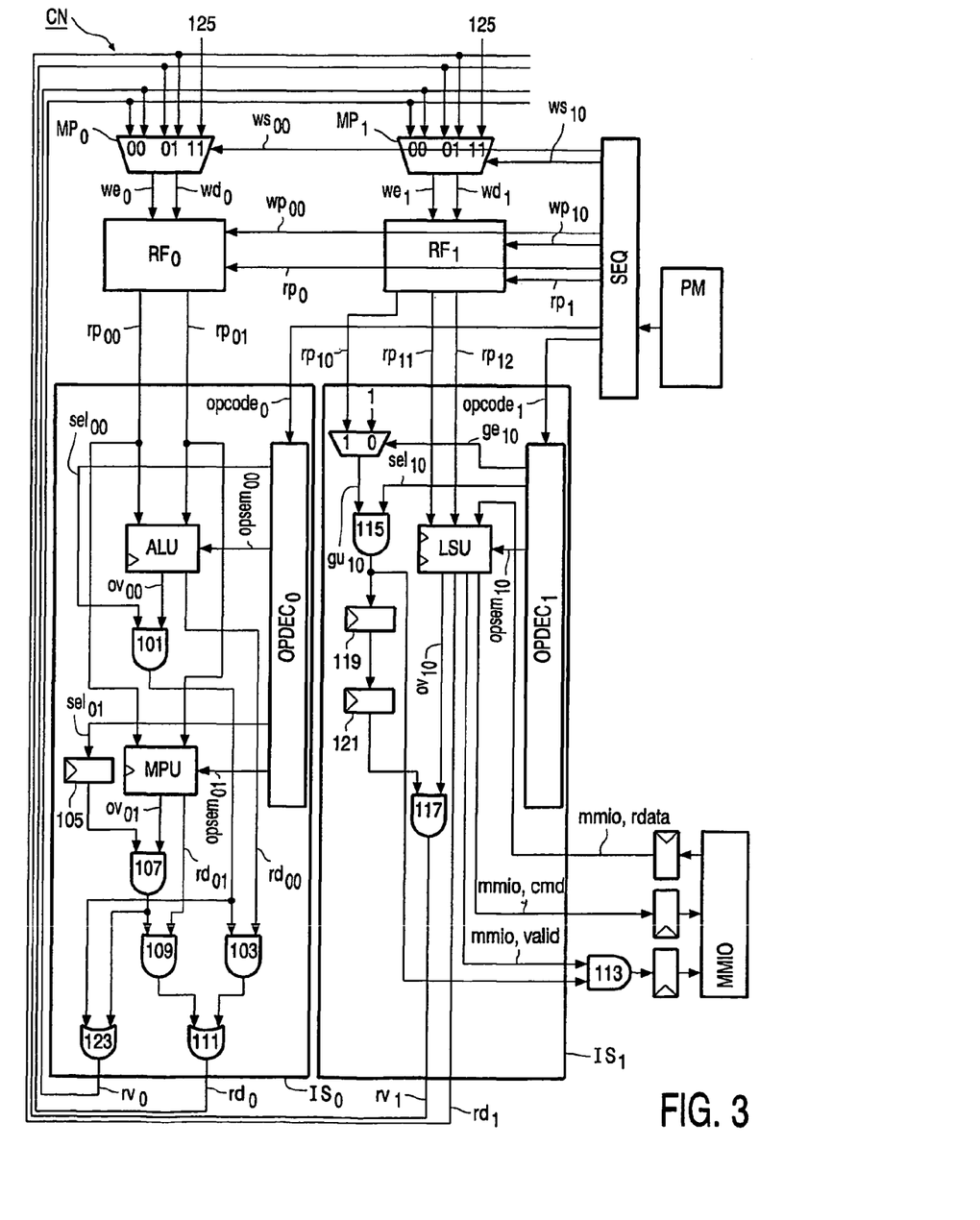
FIG. 3 shows a schematic block diagram of a second VLIW processor according to the invention.

Referring to FIG. 1 and FIG. 3, a schematic block diagram illustrates a VLIW processor comprising two issue slots $IS_0$ and $IS_1$, and two register files $RF_0$ and $RF_1$. The issue slots $IS_0$ and $IS_1$ are coupled to the register files $RF_0$ and $RF_1$ via a connection network CN. Both register files $RF_0$ and $RF_1$ have eight registers each. Issue slot $IS_0$ has two functional units, an arithmetic/logical unit (ALU) and a multiplication unit (MPU). Both functional units ALU and MPU are coupled to register file $RF_0$, via connections $rp_{00}$ and $rp_{01}$. Functional unit ALU has internally zero pipeline stages and can perform seven different operations: add, subtract, logic AND, logic OR, logic XOR, logic-shift-left and logic-shift-right, which are controlled by opcodes, i.e. operation codes, 0 until 6, respectively. Functional unit MPU has internally one pipeline stage, and can perform four different operations: signed multiply lower half result, signed multiply upper half result, unsigned multiply lower half result, unsigned multiply upper half result, which are controlled by opcodes 7 until 10, respectively. Both register files $RF_0$ and $RF_1$ have a latency of one cycle, and as a result the total latency of an operation performed by the functional unit ALU is one cycle, and the total latency of an operation performed by the functional unit MPU is two cycles. Issue slot $IS_1$ contains one functional unit, which is a load/store unit LSU. The load store unit LSU is coupled to register file $RF_1$ via connections $rp_{10}$, only in case of FIG. 3, and $rp_{11}$ and $rp_{12}$, and is also coupled to memory mapped device MMIO. The functional units ALU and MPU can pass their result data via connection $rd_0$ and multiplexers $MP_0$ and $MP_1$ to register files $RF_0$ and $RF_1$, respectively. Functional unit LSU can pass its result data via connection $rd_1$ and multiplexers $MP_0$ and $MP_1$ to register files $RF_0$ and $RF_1$, respectively. In operation, the sequencer SEQ retrieves VLIW instruction words from program memory PM, and decodes these instruction words. In general, these instructions comprise RISC like operations, requiring two operands and producing one result, as well as custom operations that may consume more than two operands and may produce more than one result. Some instructions may require an immediate value as operand data. Results of the decoding step are write select indices $ws_{00}$ and $ws_{10}$, write register indices $wp_{00}$ and $wp_{10}$, read register indices $rp_{00}$, $rp_{01}$, $rp_{10}$ (FIG. 3), $rp_{11}$ and $rp_{12}$, and opcodes $opcode_0$ and $opcode_1$. Potentially, immediate values are retrieved from the instruction as well, however, these are not included in the given example, without impacting the proposed solution. Via the couplings between the sequencer SEQ and multiplexer $MP_0$ and $MP_1$, the write select indices $ws_{00}$ and $ws_{11}$ are provided to the multiplexers $MP_0$ and $MP_1$, respectively. The write select indices $ws_{00}$ and $ws_{11}$ are used by the corresponding multiplexer for selecting the required input channel for the result data $rd_0$ and $rd_1$ that have to be written to register files $RF_0$ and/or $RF_1$. The sequencer SEQ is coupled to the register files $RF_0$ and $RF_1$ for providing the write register indices $wp_{00}$ and $wp_{10}$, respectively, for selecting a register from the corresponding register file to which data have to be written. The sequencer SEQ also provides the read register indices $rp_{00}$ and $rp_{01}$ to register file $RF_0$ via connection $rp_0$, and read register indices $rp_{10}$, $rp_{11}$ and $rp_{12}$ to register file $RF_1$ via connection $rp_1$, for selecting a register from the corresponding register file from which input data for the functional units have to be read. The sequencer SEQ is coupled to the operation decoder $OPDEC_0$ from issue slot $IS_0$ for providing opcode $opcode_0$, and the sequencer SEQ is coupled to the operation decoder $OPDEC_1$ from issue slot $IS_1$ for providing opcode $opcode_1$. The operation decoders $OPDEC_0$ and $OPDEC_1$ decode their respective opcode. Operation decoder $OPDEC_0$ provides the unit select signal $sel_{00}$ and $sel_{01}$ to functional unit ALU and functional unit MPU, respectively. The operation decoder $OPDEC_0$ also provides the operation semantics $opsem_{00}$ and $opsem_{01}$ to the functional unit ALU and the functional unit MPU, respectively. The unit select signals $sel_{00}$ and $sel_{01}$ are used to activate functional unit ALU and functional unit MPU, respectively, if that functional unit has to perform an operation. Operands, if applicable, are retrieved from register files $RF_0$ under control of the read register indices $rp_{00}$ and $rp_{01}$, provided to the register file via connection $rp_0$. The unit select signals $sel_{00}$ and $sel_{01}$ are derived from the value of operation code $opcode_0$. In case operation code $opcode_0$ indicates an operation to be executed by functional unit ALU, unit select signal $sel_{00}$ is set to true, and otherwise to false. In case operation code $opcode_0$ indicates an operation to be executed by functional unit MPU, unit select signal $sel_{01}$ is set to true, and otherwise to false. The operation semantics $opsem_{00}$ and $opsem_{01}$ indicate the type of operation that has to be performed by the corresponding functional unit ALU and MPU. The unit select signal $sel_{00}$ is ANDed by AND gate 101 with the output valid index $ov_{00}$, and the resulting signal is ANDed by AND gate 103 with the result data $rd_{00}$, i.e. the result data produced by functional unit ALU. The unit select signal $sel_{01}$ is delayed according to the pipeline depth of the functional unit MPU, i.e. delayed by register 105. The delayed unit select signal $sel_{01}$ is ANDed with the output valid index $ov_{01}$ by AND gate 107, and the resulting signal is ANDed with the result data $rd_{01}$, i.e. the result data produced by functional unit MPU, by AND gate 109. The output signals of AND gates 103 and 109 are ORed by OR gate 111. The output valid indices $ov_{00}$ and $ov_{01}$ are true if the corresponding result data $rd_{00}$ and $rd_{01}$ are valid output data, otherwise they are false. In case functional unit ALU is selected for performing an operation, unit select signal $sel_{00}$ is set to true and unit select signal $sel_{01}$ is set to false. If the output valid index $ov_{00}$ is set to true by functional unit ALU, the result data $rd_{00}$ are output by OR gate 111 as result data $rd_0$. In case functional unit MPU is selected for performing an operation, unit select signal $sel_{00}$ is set to false and unit select signal $sel_{01}$ is set equal to true. If the output valid index $ov_{01}$ is set to true by functional unit MPU, the result data $rd_{01}$ are output by OR gate 111 as result data $rd_0$. Operation decoder $OPDEC_1$ provides the unit select signal $sel_{10}$ as well as the operation semantics $opsem_{10}$, by decoding operation code $opcode_1$. The unit select signals $sel_{10}$ is derived from the value of operation code $opcode_1$. The operation semantics $opsem_{10}$ indicates the type of operation that has to be performed by the functional unit LSU. Operand data, if any, are retrieved from register file $RF_1$, under control of read register indices $rp_{10}$, $rp_{11}$ and $rp_{12}$. The functional unit LSU supports two operations, i.e. a load operation and a store operation, indicated by a value of operation code $opcode_1$ of 0 and 1, respectively. The functional unit LSU controls memory mapped I/O device MMIO by sending commands mmio_cmd to the MMIO device, the validity of which is indicated by a valid signal mmio_valid. The command mmio_cmd consists of a flag indicating whether a read, in case of a load operation of the functional unit LSU, or a write, in case of a store operation of the functional unit LSU, has to be performed on the MMIO device. The command mmio_cmd further contains a memory address, and in case of a write command, the data to be written. The MMIO device returns data mmio_rdata to the functional unit LSU in case a read command was issued. The MMIO device can be any device supporting data communication and/or storage based on memory mapped I/O. These include normal memories, FIFOs, and peripheral devices which have data storage locations or control/status/IO registers that are memory mapped. The functional unit LSU sends the command to the MMIO device in the first cycle of executing an operation, and expects data back, in case of a load operation, in the third cycle. In case of a load operation performed by the functional unit LSU, valid result data $rd_1$ will be output two cycles after a load operation was performed. These result data $rd_1$ will be the data read from the MMIO device, as a result of that load operation. In case of a store operation performed by the functional unit LSU, no valid result data $rd_1$ are output. Result data $rd_0$ and $rd_1$, which may be 32 bit values for example, can be written to register files $RF_0$ and $RF_1$ via connection network CN and multiplexers $MP_0$ and $MP_1$, under control of write select indices $ws_{00}$ and $ws_{10}$, and write register indices $wp_{00}$ and $wp_{10}$.

Referring to FIG. 1, the functional unit LSU also supports a NOP instruction. This NOP instruction can be selected using a dedicated value for operation code $opcode_1$, i.e. a value equal to three. The operation decoder $OPDEC_1$ decodes the operation code $opcode_1$, and in case of a load or store operation the unit, select signal $sel_{10}$ is set equal to true, whereas in case of the dedicated NOP opcode, the unit select signal $sel_{10}$ is set equal to false. The unit select signal $sel_{10}$ is ANDed with the mmio_valid signal by AND gate 113 and the resulting signal is provided to the MMIO device. As a result, in case of a NOP instruction, no read or write command is performed on the MMIO device. The write register indices $wp_{00}$ and $wp_{10}$ can be used to select a virtual register, a so-called trashcan register, in case no result data $rd_0$ and $rd_1$ have to be written back to register files $RF_0$ and $RF_1$. For this purpose the registers with index seven of register files $RF_0$ and $RF_1$ are reserved as trashcan register.

Referring to FIG. 3, the functional unit LSU also supports a guarded store operation, where a third argument is used as a guard $gu_{10}$. Time-stationary multiple-instruction word processors that support conditional operations are also described in a previous European patent application no. 03101038.2 filed by the applicant. The guarded store operation is selected via the value of two for operation code $opcode_1$. Guarding is controlled by the guard enable signal $ge_{10}$. The operation decoder $OPDEC_1$ sets the value of the guard enable signal gem equal to true in case of a guarded store operation, otherwise the value of the guard enable signal $ge_{10}$ is set to false. In case the guard enable signal $ge_{10}$ is equal to true, the value of the guard signal $gu_{10}$ is read from register file $RF_1$, from the register referred to by read register index $rp_{10}$. In case the guard enable signal $ge_{10}$ is equal to false, the guard signal $gu_{10}$ is set default to true. The functional unit LSU further supports a NOP instruction. This NOP instruction can be selected using a dedicated value for operation code $opcode_1$, i.e. a value equal to three. In operation, the operation decoder $OPDEC_1$ decodes the operation code $opcode_1$, and in case of a load, store or a guarded store operation, the unit select signal $sel_{10}$ is set equal to true, whereas in case of the dedicated NOP opcode, the unit select signal $sel_{10}$ is set equal to false. The unit select signal $sel_{10}$ is ANDed with the guard signal $gu_{10}$ by AND gate 115. The resulting signal is ANDed with the mmio_valid signal by AND gate 113 and the resulting signal is provided to the MMIO device. As a result, in case of a NOP instruction, no read or write command is performed on the MMIO device. The signal output by AND gate 115, is also further delayed according to the pipeline depth of the functional unit LSU by registers 119 and 121, and ANDed with the output valid signal $ov_{10}$ of functional unit LSU, by AND gate 117. The resulting signal is output by AND gate 117 as result valid signal $rv_1$. The signals output by AND gates 101 and 107 are ORed by OR gate 123. OR gate 123 outputs the resulting signal as result valid signal $rv_0$. The result valid signals $rv_0$ and $rv_1$ may be one bit values, for example. The write select the AND gate 113 outputs a signal equal to false. In case the guard signal $gu_{10}$ is equal to false, the result valid signal $rv_1$ is set to false as well, which means that the writing back of result data $rd_1$ to a register file is disabled as well.

Below a small program fragment in assembly code is shown, to be executed by a VLIW processor according to FIG. 1, and comprising instructions INS(i), INS(i+1) and INS(i+2).

Figure 2:
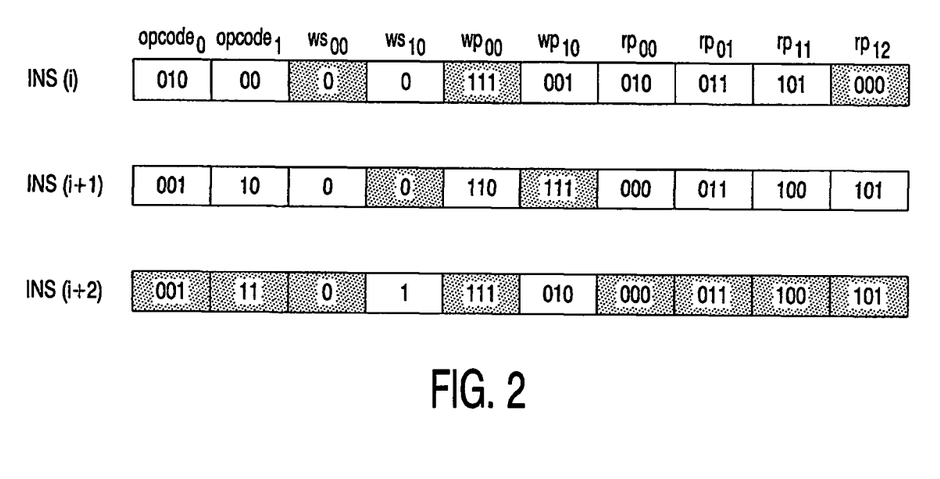
FIG. 2 shows a set of multiple-instruction words that can be executed by the first VLIW processor.

```
INS(i) {
    alu.and(RF0[2],RF0[3]);        /* perform logic AND on functional unit ALU taking values
    stored in registers 2 and 3 of RF0 as arguments */
    RF1[1]=alu.op00;               /* write result of logic AND operation by functional unit
    ALU in register 1 of RF1 */
    lsu.load_0(RF1[5]);            /* 'load' data located at memory mapped address stored in
    register 5 of RF1, by functions unit LSU */
}
INS(i+1) {
    alu.sub(RF0[0],RF0[3]);        /* subtract value in register 3 of RF0 from value in register 0
    of RF0 by functional unit ALU */
    RF0[6]=alu.op00;               /* write result of subtraction by functional unit ALU in
    register 6 of RF0 */
    lsu.store_0(RF1[4],RF1[5]);    /* store value in register 5 of RF1 at memory mapped address
    stored in register 4 of RF1, by functional unit LSU */
}
INS(i+2) {
    RF1[2]=lsu.load_2.op10;        /* store data loaded by functional unit LSU in register 2 of
    RF1 */
}
``` indices $ws_{00}$ and $ws_{10}$ are also used by the corresponding multiplexer $MP_0$ and $MP_1$ for selecting a result valid signal $rv_0$ or $rv_1$. In case a result data channel $rd_0$ or $rd_1$ is selected by a multiplexer $MP_0$ or $MP_1$, the result valid signal $rv_0$ or $rv_1$ corresponding to the selected result data channel is used to set the write enable signal $we_0$ or $we_1$, for control of writing result data to a register file. In case multiplexer $MP_0$ or $MP_1$ has selected the input channel corresponding to result data $rd_0$, the value of result valid signal $rv_0$ is used for setting the write enable signal corresponding to that multiplexer, and in case the input channel corresponding to result data $rd_1$ is selected, the value of result valid signal $rv_1$ is used for setting the corresponding write enable signal. If result valid signal $rv_0$ or $rv_1$ is true, the appropriate write enable signal $we_0$ or $we_1$ is set to true by the corresponding multiplexer $MP_0$ or $MP_1$. In case the write enable signal $we_0$ or $we_1$ is equal to true, the result data $rd_0$ or $rd_1$ are written to the register file $RF_0$ or $RF_1$, via write data $wd_0$ and $wd_1$ respectively, in a register selected via the write register index $wp_{00}$ or $wp_{10}$ corresponding to that register file. In case the write enable signal $we_0$ or $we_1$ is set to false, though via the corresponding write select index $ws_{00}$ or $ws_{10}$ an input channel for writing result data $rd_0$ or $rd_1$ to the corresponding register file $RF_0$ or $RF_1$ has been selected, no data will be written into that register file. The write select indices $ws_{00}$ and $ws_{10}$ can be used to select a default input channel 125. In case this default input channel 125 is selected via the write select indices $ws_{00}$ or $ws_{10}$, the corresponding write enable signal $we_0$ or $we_1$ is default set to false, and hence no result data are written back to the corresponding register file. Using the guard signal $gu_{10}$, the conditional write back of result data for time-stationary VLIW processors is allowed. The value determining the guard signal is calculated, for example by executing an instruction on the functional unit ALU, and the result is stored in register file $RF_1$. When executing a guarded store operation on the functional unit LSU, and the guard signal $gu_{10}$ is equal to true, AND gate 113 outputs a mmio_valid signal equal to true to the MMIO device, and the store command is performed by the MMIO device. In case the guard signal $gu_{10}$ is equal to false, no store command is performed by the MMIO device, since The time-stationary information composing an instruction, is specified between curly braces and separated by semicolons. Absence of information for a particular resource, e.g. an opcode for a particular functional unit or selection of an input value for a functional unit, implies a NOP code for this particular resource. The compiler is assumed to schedule each pipeline stage of an operation explicitly. The pipeline number n of an operation is indicated in the program fragment by an '_n' postfix, e.g. see load_0 and load_2. In the given example, the second pipeline stage of the load instruction (load_1) does not appear, since no control information is required for this pipeline stage, as no argument is sampled, result is produced, or opcode is selected in this stage. An embodiment of the binary encoding for this program fragment is shown in FIG. 2. In FIG. 2, the three instruction words INS(i), INS(i+1) and INS(i+2) are shown, in binary format. The first instruction field of the VLIW instruction words encodes the operation code $opcode_0$ for the issue slot $IS_0$ containing functional units ALU and MPU, the second instruction field encodes the operation code $opcode_1$ for issue slot $IS_1$ containing the functional unit LSU, the third and fourth instruction field encode the write select indices $ws_{00}$ and $ws_{10}$, respectively. The fifth and sixth instruction field encode the write register indices $wp_{00}$ and $wp_{10}$, respectively. The seventh until tenth instruction field encode the read register indices $rp_{00}$, $rp_{01}$, $rp_{11}$ and $rp_{12}$, respectively. The grey fields in the instruction words indicate that NOP information is encoded. In order to minimise bit changes when fetching and executing control information related to NOP instructions, during translation of the program fragment in assembly code to the binary encoding shown in FIG. 2, in case of control information related to a NOP instruction, the NOP code in the corresponding field is a repeat of the corresponding field of the previous VLIW instruction word. For example, the binary encoding of the NOP code in field encoding the read register index $rp_{00}$ of INS(i+2) is a repeat of that in the same field of INS(i+1), and the same holds for the fields related to read register indices $rp_{00}$, $rp_{01}$, $rp_{11}$ and $rp_{12}$ in INS(i+2), which are repeats from the corresponding fields of INS(i+1). However, for the fields encoding the write register indices $wp_{00}$ and $wp_{10}$ a dedicated NOP code is required in order to disable the write back of result data $rd_0$ and $rd_1$ to register files $RF_0$ and $RF_1$ during execution of a NOP instruction. If the write back of the result data would not be disabled, the state of the VLIW processor may be changed as a result of the execution of the NOP instruction, i.e. the contents of registers could change unintentionally Therefore, in case of a NOP instruction, the fields encoding the write register indices $wp_{00}$ and $wp_{10}$ are encoded using the value '111' referring to the trashcan register, i.e. a virtual register of the register file, as shown, for example, in the field related to write register index $wp_{00}$ in INS(i+2) and the field related to write register index $wp_{10}$ in INS(i+1). Furthermore, for the field encoding the operation code $opcode_1$ for the issue slot $IS_1$ containing the functional unit LSU a dedicated NOP code is required as well, in case of a NOP instruction, in order to prevent changes in the state of the VLIW processor. For example, a load operation will change the contents of a FIFO buffer that may be used for the processor's I/O by extracting and removing data from such buffer. A load operation may also change the contents of data caches that may be present, by causing the unintentional fetching of blocks of data when the unintentional load would result in a miss in the cache Therefore, in case of a NOP instruction, the field encoding the operation code $opcode_1$ of the issue slot $IS_1$ containing functional unit LSU is encoded using the dedicated NOP opcode, i.e. a value of three, as for example shown in the field related to the opcode field $IS_1$ in INS(i+2) The issue slot $IS_0$ containing the functional units ALU and MPU does not require a dedicated NOP code for encoding a NOP opcode, since when repeating the encoding of a previous instruction word, there is no risk of changes in the state of the VLIW processor. Therefore in the field related to the opcode field $IS_0$ in INS(i+2), the NOP opcode is a repeat of the opcode in the corresponding field of INS(i+1).

Figure 4:
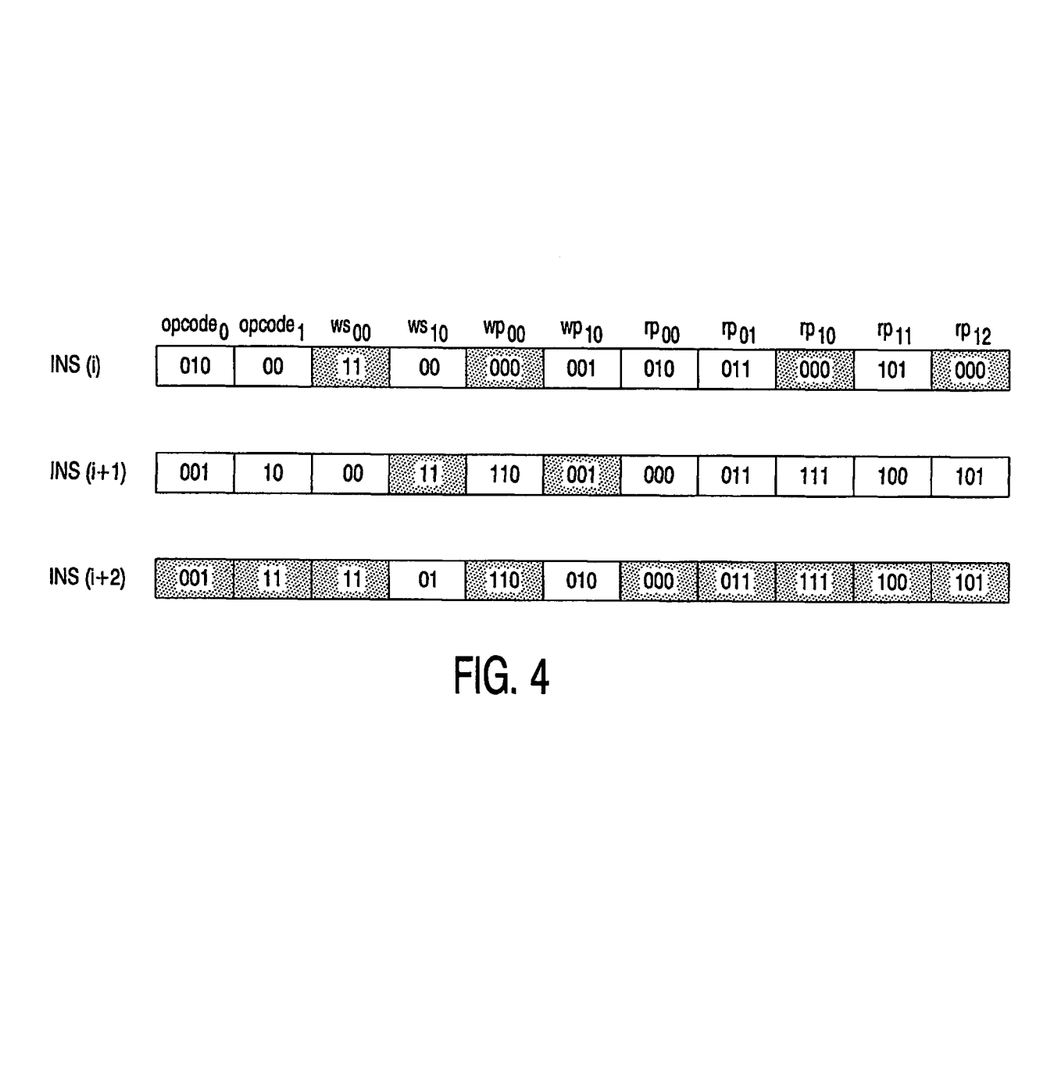
FIG. 4 shows a set of multiple-instruction words that can be executed by the second VLIW processor.

Below a small program fragment in assembly code is shown, to be executed by a VLIW processor according to FIG. 3, and comprising instructions INS(i), INS(i+1) and INS(i+2).

resource conflicts that may arise between different operations and the pipeline number n of an operation is indicated in the program fragment by an '_n' postfix. An example of the binary encoding for this program fragment is shown in FIG. 4. In FIG. 4, the three instruction words INS(i), INS(i+1) and INS(i+2) are shown, in binary format. The first instruction field of the instruction words encodes the operation code $opcode_0$ for the issue slot $IS_0$ containing the functional units ALU and MPU, the second instruction field encodes the operation code $opcode_1$ for the issue slot $IS_1$ containing the functional unit LSU, the third and fourth instruction field encode the write select indices $ws_{00}$ and $ws_{10}$, respectively. The fifth and sixth instruction field encode the write register indices $wp_{00}$ and $wp_{10}$, respectively. The seventh until eleventh instruction field encode the read register indices $rp_{00}$, $rp_{01}$, $rp_{10}$, $rp_{11}$ and $rp_{12}$, respectively. The grey fields in the instruction words indicate that NOP information is encoded. In order to minimise bit changes when execution control information related to NOP instructions, during translation of the program fragment in assembly code to the binary encoding shown in FIG. 3, in case of a control information related to a NOP instruction, the NOP code in the corresponding field is a repeat of the corresponding field of the previous VLIW instruction word. For example, the binary encoding of the NOP code in field encoding the write register index $wp_{10}$ of INS(i+1) is a repeat of that in the same field of INS(i). Also, the fields related to read register indices $rp_{00}$, $rp_{01}$, $rp_{10}$, $rp_{11}$ and $rp_{12}$ in INS(i+2) are all repeated from the corresponding fields of INS(i+1). However, for the fields encoding the write select indices $ws_{00}$ and $ws_{10}$ a dedicated NOP code is required in order to disable the write back of result data $rd_0$ and $rd_1$ to register files $RF_0$ and $RF_1$ during execution of a NOP instruction. If the write back of the result data would not be disabled, the state of the VLIW processor may be changed as a result of the execution of the NOP instruction. Therefore, in case of a NOP instruction, the fields encoding the corresponding write select indices $ws_{00}$ and $ws_{10}$ are encoded using the value '11' referring to the input channel 125, which by default sets the corresponding write enable signal $we_0$ and $we_1$ to false, see for example the field related to write register index $ws_{00}$ in

```
INS(i) {
alu.and(RF0[2],RF0[3]);      /* perform logic AND on functional unit ALU taking
register 2 and 3 of RF0 as arguments */
RF1[1]=alu.op00;              /* write result of logic AND operation by functional unit
ALU in register 1 of RF1 */
lsu.load__0(RF1[5]);          /* 'load' data located at memory mapped address stored in
register 5 of RF1, by functional unit LSU */
}
INS(i+1) {
alu.sub(RF0[0],RF0[3]);      /* subtract value in register 3 of RF0 from value in register 0
of RF0 */
RF0[6]=alu.op00;              /* write result of subtraction by functional unit ALU in
register 6 of RF0 */
if(RF1[7])
lsu.store__0(RF1[4],RF1[5]); /* if the value in register 7 of RF1 is not zero then store value
in register 5 of RF1 at memory mapped address stored in register 4 of RF1, by functional unit
LSU */
}
INS(i+2) {
RF1[2]=lsu.load__2.op10;     /* store data loaded by functional unit LSU in register 2 of
RF1 */
}
```

Absence of information for a particular resource, e.g. an opcode for a particular functional unit or selection of an input value for a functional unit, implies a NOP code for this particular resource. The compiler is assumed to schedule each pipeline stage of an operation explicitly to prevent any INS(i+2) and the field related to write register index $ws_{10}$ in INS(i+1). Furthermore, for the field encoding the operation code $opcode_1$ for the issue slot $IS_1$ containing the functional unit LSU a dedicated NOP code is required as well, in case of a NOP instruction, in order to prevent changes in the state of the VLIW processor. Therefore, the field encoding the operation code opcode$_1$ of the issue slot IS$_1$ in INS(i+2) is encoded using the dedicated NOP opcode, i.e. a value of three. The functional unit ALU does not require a dedicated NOP code, and in INS(i+2) the NOP opcode is a repeat of the opcode in the corresponding field of INS(i+1).

Referring to FIGS. 2 and 4, when executing NOP instruction related control information, the number of bit changes is minimized. As a result, more combinatoric logic in the corresponding processor will carry the same values as in the previous cycle and consequently less rippling of data transitions and therefore wasting of power will occur.

In an alternative embodiment, when encoding control information related to a NOP instruction, the NOP code in the corresponding field is a repeat of the corresponding field of the succeeding instruction word. For example, referring to FIG. 2, in this case the binary encoding of the NOP code in field encoding the read register index rp$_{12}$ of INS(i) is a repeat of that in the same field of INS(i+1), i.e. a value of '101', instead of '000' as indicated in FIG. 2.

During the translation of a compiled or manually written assembly program into binary program code, the assembler keeps track of the multiple-instruction word that precedes and/or succeeds the current multiple-instruction word being translated. While translating the current instruction, the assembler can repeat the corresponding values encoded for a field of the preceeding or succeeding multiple-instruction word whenever NOP code must be encoded for a given field of the current instruction. Alternatively, for issue slots having deeper pipelining, a dedicated NOP opcode value can be encoded instead of repeating the values encoded for a corresponding field of an adjacent multiple-instruction word. Especially in case of issue slots having deeper pipelines, the dedicated NOP opcode can be used to control clock gating of pipeline stages to save power in sequential logic and the same time obtaining data gating. For issue slots having no or undeep pipelines, encoding of NOP code can be done by repeating the values encoded for a corresponding field of an adjacent multiple-instruction word. In a further alternative embodiment, encoding of NOP code can be done by repeating the values encoded for a corresponding field of a multiple-instruction word most likely to precede or succeed, during actual execution, the current multiple-instruction word being translated. The most likely preceeding or succeeding instruction can be derived from profiling information, for example.

In another embodiment the communication network CN may be a partially connected communication network, i.e. not every issue slot IS$_0$ and IS$_1$ is coupled to all register files RF$_0$ and RF$_1$. In case of a large number of issue slots, the overhead of a fully connected communication network will be considerable in terms of silicon area, delay and power consumption. During design of the VLIW processor it is decided to which degree the functional units are coupled to the register files, depending on the range of applications that has to be executed.

In another embodiment, the processor comprises a single register file, instead of a distributed register file comprising register files RF$_0$ and RF$_1$. In case the number of issue slots of a VLIW processor is relatively small, the overhead of a single register file is relatively small as well.

In another embodiment, the VLIW processor may have a different number of issue slots and/or an issue slot may comprise a different number of functional units. The number of functional units depends on the type of applications that the VLIW processor has to execute, amongst others. The processor may also have a different number of register files, connected to said issue slots.

In another embodiment, the issue slots IS$_0$ and IS$_1$ may have a different number of input and/or output ports, depending on the type of operations that the issue slots have to perform, i.e. operations that require more than two operands and/or produce more than one result. The register files RF$_0$ and/or RF$_1$ may also have a different number of read and/or write ports.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for processing data using a time-stationary multiple-instruction word processing apparatus, arranged to execute a plurality of instructions in parallel, said method comprising the following steps:
generating a set of multiple-instruction words, wherein each multiple-instruction word comprises a plurality of instruction fields, wherein each instruction field encodes control information for a corresponding resource of the processing apparatus, and wherein bit changes between an instruction field related to a no-operation instruction, and a corresponding instruction field of an adjacent multiple-instruction word are minimized;
storing input data in a register file;
processing data retrieved from the register file based on control information derived from the set of multiple-instruction words; and
disabling the write back of result data to the register file during execution of a no-operation instruction using a first dedicated no-operation code.

2. The method for processing data according to claim 1, further comprising the step of:
further preventing a change in the state of the processing apparatus during execution of a no-operation instruction using a second dedicated no-operation code for encoding an opcode.

3. The method for processing data according to claim 1, wherein the adjacent multiple instruction word is adjacent to the multiple-instruction word, comprising the instruction field related to the no-operation instruction, in the set of multiple-instruction words as derived after compilation of a computer program.

4. The method for processing data according to claim 1, wherein the adjacent multiple instruction word is most likely to be adjacent to the multiple-instruction word, comprising the instruction field related to the no-operation instruction, during execution of the set of multiple-instruction words, as derived from profiling information.

5. The method for processing data according to claim 1, wherein the steps are performed by a processing apparatus comprising:
a plurality of issue slots arranged for parallel execution of the plurality of instructions;
a register file accessible by the plurality of issue slots;

a communication network for coupling the plurality of issue slots and the register file; and a controller arranged for controlling the processing apparatus based on control information derived from the set of multiple-instruction words.

6. The method according to claim 5, wherein the register file is a distributed register file.

7. The method according to claim 5, wherein the communication network is a partially connected communication network.

8. The method according to claim 5, wherein the processing apparatus is a time-stationary Very Large Instruction Word processor.

9. A method for generating a set of multiple-instruction words in binary program code from a corresponding set of multiple-instruction words in assembly language, wherein each multiple-instruction word comprises a plurality of instruction fields and wherein the set of multiple-instruction words is to be executed by a time-stationary processing apparatus having a plurality of issue slots, and a register file coupled to the plurality of issue slots, said method comprising the following steps:

sequencing through the set of multiple-instruction words, determining whether there is a change from an instruction to a no-operation instruction for the same instruction field, minimizing the bit changes between an instruction field related to a no-operation instruction and a corresponding instruction field of an adjacent multiple-instruction word, inserting a first dedicated NOP code in the binary program code of the no-operation instruction in order to disable the write back of result data to the register file during execution of a no-operation instruction.

10. A non-transient computer-readable medium comprising computer-executable instructions for a compiler program that is executable on a computer system for generating a sequence of instructions in binary program code according to the steps of the method recited in claim 9.

* * * * *